(12) United States Patent
Fox

(10) Patent No.: US 6,906,749 B1
(45) Date of Patent: Jun. 14, 2005

(54) CMOS TDI IMAGE SENSOR

(75) Inventor: Eric Fox, Waterloo (CA)

(73) Assignee: DALSA, Inc., Waterloo (CA)

( * ) Notice: Subject to any disclaimer, the term of this patent is extended or adjusted under 35 U.S.C. 154(b) by 0 days.

(21) Appl. No.: 09/393,311

(22) Filed: Sep. 10, 1999

Related U.S. Application Data

(60) Provisional application No. 60/100,558, filed on Sep. 16, 1998.

(51) Int. Cl.$^7$ ........................... H04N 5/335; H04N 3/14
(52) U.S. Cl. ........................................ 348/295; 348/302
(58) Field of Search ............................... 348/295, 302

(56) References Cited

U.S. PATENT DOCUMENTS

| | | | |
|---|---|---|---|
| 4,445,117 A | | 4/1984 | Gaalema et al. |
| 4,677,735 A | * | 7/1987 | Malhi .......................... 438/154 |
| 4,922,337 A | * | 5/1990 | Hunt et al. ................... 358/101 |
| 5,083,016 A | | 1/1992 | Wyles et al. |
| 5,122,881 A | | 6/1992 | Nishizawa et al. |
| 5,262,871 A | | 11/1993 | Wilder et al. |
| 5,345,266 A | | 9/1994 | Denyer |
| 5,471,515 A | | 11/1995 | Fossum et al. |
| 5,841,126 A | | 11/1998 | Fossum et al. |
| 5,998,777 A | * | 12/1999 | Audier et al. ............... 348/295 |

OTHER PUBLICATIONS

Sunetra K. Mendis, et al., "Design Of A Low–Light–Level Image Sensor With On–Chip Sigma–Delta Analog–to–Digital Conversion", SPIE, vol. 1900, 1993, pp. 31–39.

H. Kawashima et al., "A 1/4 Inch Format 250K Pixel Amplified MOS Image Sensor Using CMOS Process", IEEE International Electron Devices Meeting, 1993, pp. 575–578.

Sunetra K. Mendis, et al., "A 128×128 CMOS Active Pixel Image Sensor For Highly Integrated Imaging Systems", IEEE International Electron Devices Meeting, 1993, pp. 583–586.

(Continued)

*Primary Examiner*—Wendy R. Garber
*Assistant Examiner*—Timothy J. Henn
(74) *Attorney, Agent, or Firm*—Millen White Zelano & Branigan PC

(57) ABSTRACT

A column slice of a CMOS TDI sensor includes a column bus, a column of pixels, plural first switches, a column of accumulators, plural second switches, plural third switches and output bus 39. Each of the plural first switches is coupled between the column bus and a corresponding pixel of the column of pixels, and each of the plural second switches is coupled between the column bus and a corresponding accumulator of the column of accumulators. In operation, only one switch at a time of plural first switches is "on" to connect the voltage signal from a corresponding pixel to the column bus while all remaining plural first switches are "off" to isolate the column bus from all remaining pixels. Only one of the plural second switches is "on" to connect the signal on the column bus to an accumulator while all remaining plural second switches are "off" to isolate the bus from all remaining accumulators. A main control circuit includes first and second shift registers to control the plural first and second switches to couple a signal from each pixel of the column of pixels into a corresponding accumulator of the column of accumulators while updating the accumulator until signals from all pixels have been transferred into corresponding accumulators. After this update cycle, an accumulated signal from the one accumulator that is currently addressed by a third shift register is read to the output. Then, the first and third shift registers are incremented. A new update cycle begins when a point in a moving image focused on the column slice crosses a pixel boundary. The same pattern repeats continuously. Valid TDI data is produced at the output after a number of full cycles of the transfer of pixels signals to the accumulators has been complete, the number being equal to the number of pixels.

10 Claims, 7 Drawing Sheets

OTHER PUBLICATIONS

Boyd Flower, et al., "TP 13.5: A CMOS Area Image Sensor With Pixel–Level A/D Conversion", IEEE International Solid–State Circuits Conference, 1994, pp. 226–227.

Sunetra Mendis, et al., "CMOS Active Pixel Image Sensor", IEEE Transactions On Electron Devices, vol. 41, No. 3, Mar. 1994, pp. 452–453.

R. H. Nixon, et al., "128×128 CMOS Photodiode–Type Active Pixel Sensor With On–Chip Timing, Control And Signal Chain Electronics", SPIE, vol. 2415, 1995, pp. 117–123, Larry Armstrong, "Nasa's Tiny Camera Has A Wide–Angle Future", Science & Technology, Business Week, Mar. 6, 195, pp. 54–55.

Zhimin Zhou, "On–Chip Signal Processing For CMOS Active Pixel Image Sensors", UMI, 1997, pp. i–260.

DeWitt Ong, "An All–Implanted CCD/CMOS Process", IEEE Transactions On Electron Devices, vol. Ed–28, No. 1, Jan. 1981, pp. 6–12.

D. Renshaw, et al., "ASIC Image Sensors", Department of Electrical Engineering, University Of Edinburgh, IEEE, 1990, pp. 3038–3041.

Orly Yadid–Pecht, et al., "A Random Access Photodiode Array For Intelligent Image Capture", IEEE Transactions On Electron Devices, vol., 38, No. 8, Aug. 1991, pp. 1772–1780.

Sabrina E. Kemeny, et al., "Update On Focal–Plane Image Processing Research", SPIE, vol. 1447, Charge–Coupled Devices And Solid State Optical Sensors II, 1991, pp. 243–250.

Eric R. Fossum, "Future Directions In Focal–Plane Signal Processing For Space–Borne Scientific Imagers", SPIE, vol. 1541, Infrared Sensors: Detectors, Electronics, and Signal Processing, 1991, pp. 62–67.

Sabrina E. Kemeny, et al., "CCD Focal–Plane Image Reorganization Processors For Lossless Image Compression", IEEE Journal Of Solid–State Circuits, vol. 27, No. 3, Mar. 1992, p. 398–405.

J. Kramer, et al., "Industrial CMOS Technology for the Integration Of Optical Metrology Systems (photo–ASICs)", Sensors And Actuators, 1992, pp. 21–30.

B. Dierickx, et al., "The Isophot Crea25 Far Infrared Si:P Matrix", Nuclear Instruments And Methods In Physics Research, 1989, pp. 527–529.

M. Ogata, et al., "A Small Pixel CMD Image Sensor", IEEE Transactions On Electron Devices, vol., 38, No.58, May 1991, pp. 1005–1010.

Y. Matsunaga, et al., "A High–Sensitivity MOS Photo–Transistor For Area Image Sensor", IEEE Transactions On Electron Devices, vol. 38, No. 5, May 1991, pp. 1044–1047.

J. Hynecek, "BCMD–An Improved Photosite Structure for High–Density Image Sensors", IEEE Transactions On Electron Devices, vol. 38, No. 5, May 1991, pp. 1011–1020.

P. B. Denyer, et al., "CMOS Image Sensors For Multimedia Applications", IEEE Custom Integrated Circuits Conference, 1993, pp. 11.5.1–11.5.4.

E. Fossum, "Active Pixel Sensors: Are CCD's Dinosaurs?", SPIE—Charge–Coupled Devices and Solid State Optical Sensors, III, vol. 1900, 1993, pp. 2–14.

D. Standley, et al., "Analog CMOS IC for Object Position and Orientation", SPIE—Visual Information Processing: From Neurons to Chips, vol. 1473, 1991, pp. 194–201.

B. Mathur, et al., "Pixel Level Data Fusion: From Algorithm to Chip", SPIE—Visual Information Processing: From Neurons to Chips, vol. 1473, 1991, pp. 153–160.

S. Kemeny, "CCD Focal–PlaneImage Reorganization Processors", Sensors and Actuators, Columbia University, 1991, pp. 1–295.

B. Pain, "Low–Noise CMOS Circuits For On–Chip Signal Processing In Focal–Plane Arrays", Nuclear Instruments and Methods In Physics Research, Columbia University, 1993, pp. 1–251.

Christer Jansson et al., "An Addressable 256X256 Photodiode Image Sensor Array With An 8–Bit Digital Output", Analog Integrated Circuits and Signal Processing 4, 1993, pp. 37–49.

Sunetra K. Mendis, et al., "Design Of A Low–Light–Level Image Sensor With On–Chip Sigma–Delta Analog–to–Digital Conversion", SPIE, vol. 1900, 1993, pp. 31–39.

H. Kawashima et al., "A 1/4 Inch Format 250K Pixel Amplified MOS Image Sensor Using CMOS Process", IEEE International Electron Devices Meeting, 1993, pp. 575–578.

Sunetra K. Mendis, et al., "A 128 x 128 CMOS Active Pixel Image Sensor For Highly Integrated Imaging Systems", IEEE International Electron Devices Meeting, 1993, pp. 583–586.

Boyd Flower, et al., "TP 13.5: A CMOS Area Image Sensor With Pixel–Level A/D Conversion", IEEE International Solid–State Circuits Conference, 1994, pp. 226–227.

Sunetra Mendia, et al., "CMOS Active Pixel Image Sensor", IEEE Transactions On Electron Devices, vol. 41, No. 3, Mar. 1994, pp. 452–453.

R. H. Nixon, et al., "128X128 CMOS Photodiode–Type Active Pixel Sensor With On–Chip Timing, Control And Signal Chain Electronics", SPIE, vol. 2415, 1995, pp. 117–123.

Larry Armstrong, "Nasa's Tiny Camera Has A Wide–Angle Future", Science & Technology, Business Week, Mar. 6, 195, pp. 54–55.

Zhimin Zhou, "On–Chip Signal Processing For CMOS Active Pixel Image Sensors", UMI, 1997, pp. i–260.

* cited by examiner

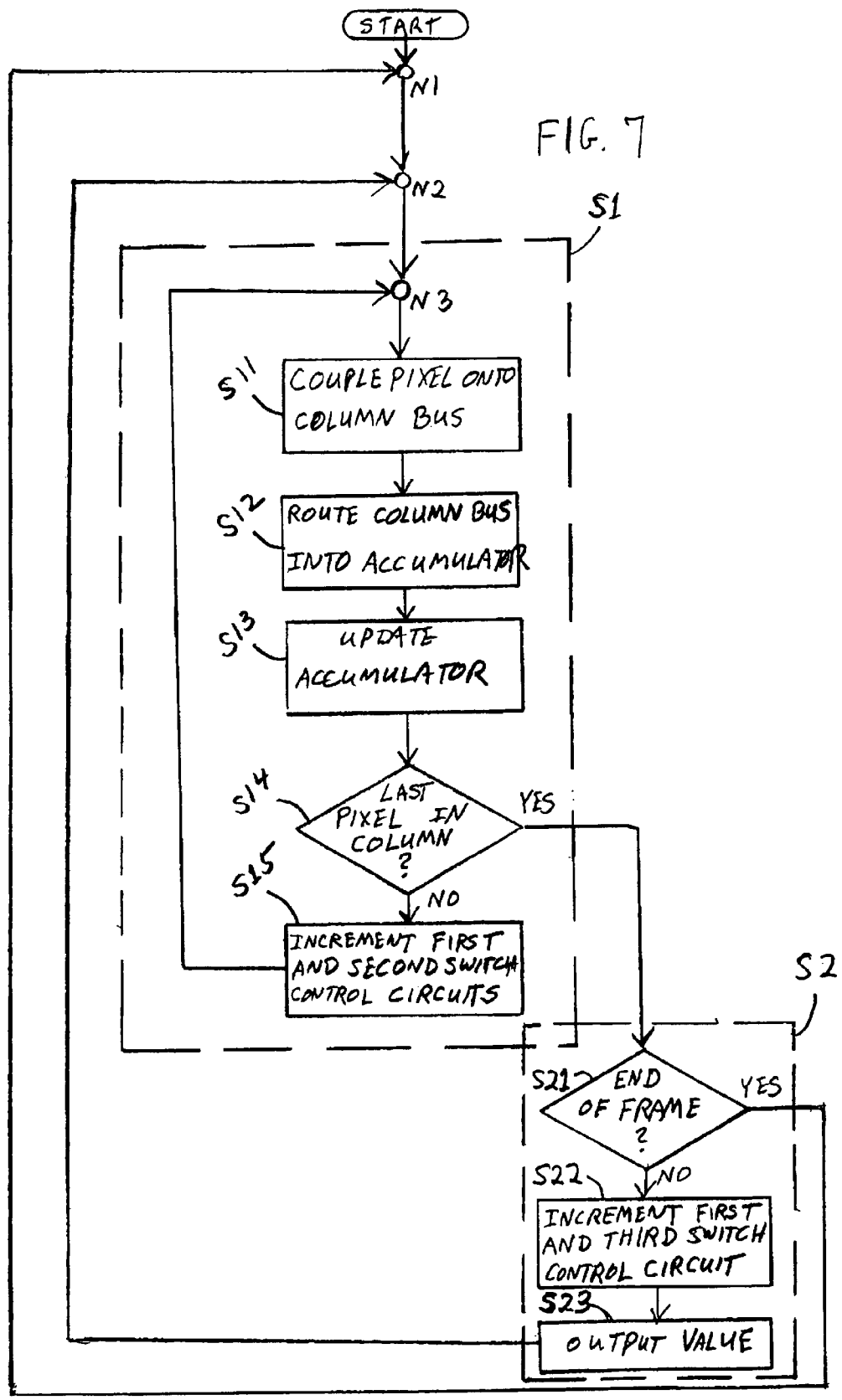

CMOS TDI IMAGE SENSOR

The priority benefit of the Sep. 16, 1998 filing date of U.S. application Ser. No. 60/100,558 is hereby claimed.

BACKGROUND OF THE INVENTION

1. Field of the Invention

The present invention relates to time delay and integration image sensor (TDI image sensor) using complimentary MOS technology (CMOS technology). In particular, the invention relates to achieving the integration function without charge transfer devices.

2. Description of Related Art

In many imaging applications the image scene moves relative to the camera at a constant velocity. For example, objects on a conveyer belt may be imaged by a stationary camera adjacent to the conveyer, or features on the ground may be imaged by a camera mounted on a moving vehicle. Such applications can be addressed by a line scan camera in which the imaging region consists of a single row of pixels. However, where the relative velocity is large, the maximum integration time available for each pixel is very small. If the velocity is sufficiently large relative to the illumination level then the image signal may too small to be useful.

Time delay and integration (TDI) image sensors are used in line scan applications where the light level is low or where the speed of the moving image is high. TDI has typically been addressed with CCD sensors in which the TDI functionality can be achieved by transferring a charge packet along the CCD synchronously with the image. Charge transfer cannot be achieved in the same way with CMOS processes, and hence a CMOS approach to TDI has been disfavored.

SUMMARY OF THE INVENTION

It is an object to the present invention to provide as sensor with TDI functionality using CMOS fabrication processes. It is a further object of the present invention to provide, in a sensor, an accumulation circuit and necessary control circuitry to affect TTDI functionality.

These and other objects are achieved in a column slice of a CMOS TDI sensor that includes a column bus, a column of pixels, plural first switches, a column of accumulators, plural second switches, plural third switches and output bus 39. Each of the plural first switches is coupled between the column bus and a corresponding pixel of the column of pixels, and each of the plural second switches is coupled between the column bus and a corresponding accumulator of the column of accumulators. In operation, only one switch at a time of plural first switches is "on" to connect the voltage signal from a corresponding pixel to the column bus while all remaining plural first switches are "off" to isolate the column bus from all remaining pixels. Only one of the plural second switches is "on" to connect the signal on the column bus to an accumulator while all remaining plural second switches are "off" to isolate the bus from all remaining accumulators. A main control circuit includes first and second shift registers to control the plural first and second switches to couple a signal from each pixel of the column of pixels into a corresponding accumulator of the column of accumulators while updating the accumulator until signals from all pixels have been transferred into corresponding accumulators. After this update cycle, an accumulated signal from the one accumulator that is currently addressed by a third shift register is read to the output. Then, the first and third shift registers are incremented. A new update cycle begins when a point in a moving image focused on the column slice crosses a pixel boundary. The same pattern repeats continuously. Valid TDI data is produced at the output after a number of full cycles of the transfer of pixels signals to the accumulators has been complete, the number being equal to the number of pixels.

BRIEF DESCRIPTION OF DRAWINGS

The invention will be described in detail in the following description of preferred embodiments with reference to the following figures wherein:

FIG. 2A is a circuit schematic of a CMOS switch as may be used in the present invention;

FIG. 2B is a circuit schematic of an NMOS switch as may be used in the present invention;

FIG. 7 is a flow chart of a method of scanning an image.

DETAILED DESCRIPTION OF PREFERRED EMBODIMENTS

There are compelling reasons for implementing image sensors with CMOS processes including process accessibility, cost, advanced design rules, and the ability to add circuit functionality that cannot at present be implemented with CMOS processes (digital signal processing, memory, etc.). For example, in instances where a designer of an image sensor does not have an "in house" foundry to fabricate the sensor in wafer form, it becomes necessary to for the designer to contract with a foundry to provide fabrication services. When doing so, the designer usually selects processes and design rules that are supported by a preselected foundry on existing production lines in order to minimize costs. Since CCD processes usually require multiple poly-crystalline silicon conductor layers and CMOS processes require only one such conductor layer, the designer will have greater flexibility using a CMOS process and design rules. The present invention is a way to use a CMOS process and still be able to achieve TDI functionality. However, the invention is not limited to an implementation in a CMOS process, nor are there any particular parts of the CMOS process necessary to implement the invention.

The issue of low signal size can be resolved by using an approach known as TDI (for time delay and integration). For TDI sensor, a finite number of line scan arrays is arranged in parallel, for example, M rows are provided (see FIG. 1). As the scene moves past the sensor, the light from any one point of the scene impinges successively on each of the M rows in succession. As the light from the one point of the scene impinges on each row, the signals collected by each of the M rows are accumulated in associated accumulators. If the electronic signal from each row at the correct instant in time is summed, then M times as much signal is available as compared to a simple single line scan sensor. An illustration of the CMOS TDI approach is shown in FIG. 1.

TDI is usually implemented with a CCD (charge coupled device) where the rows are clocked such that the charge packets move across the sensor synchronously with the image. The conversion from an electronic signal to a voltage is done as the charge packets are transferred out of the last row. Unfortunately CMOS processes do not allow for the spatial transfer of charge packets and hence this approach cannot be used.

Figure 1:
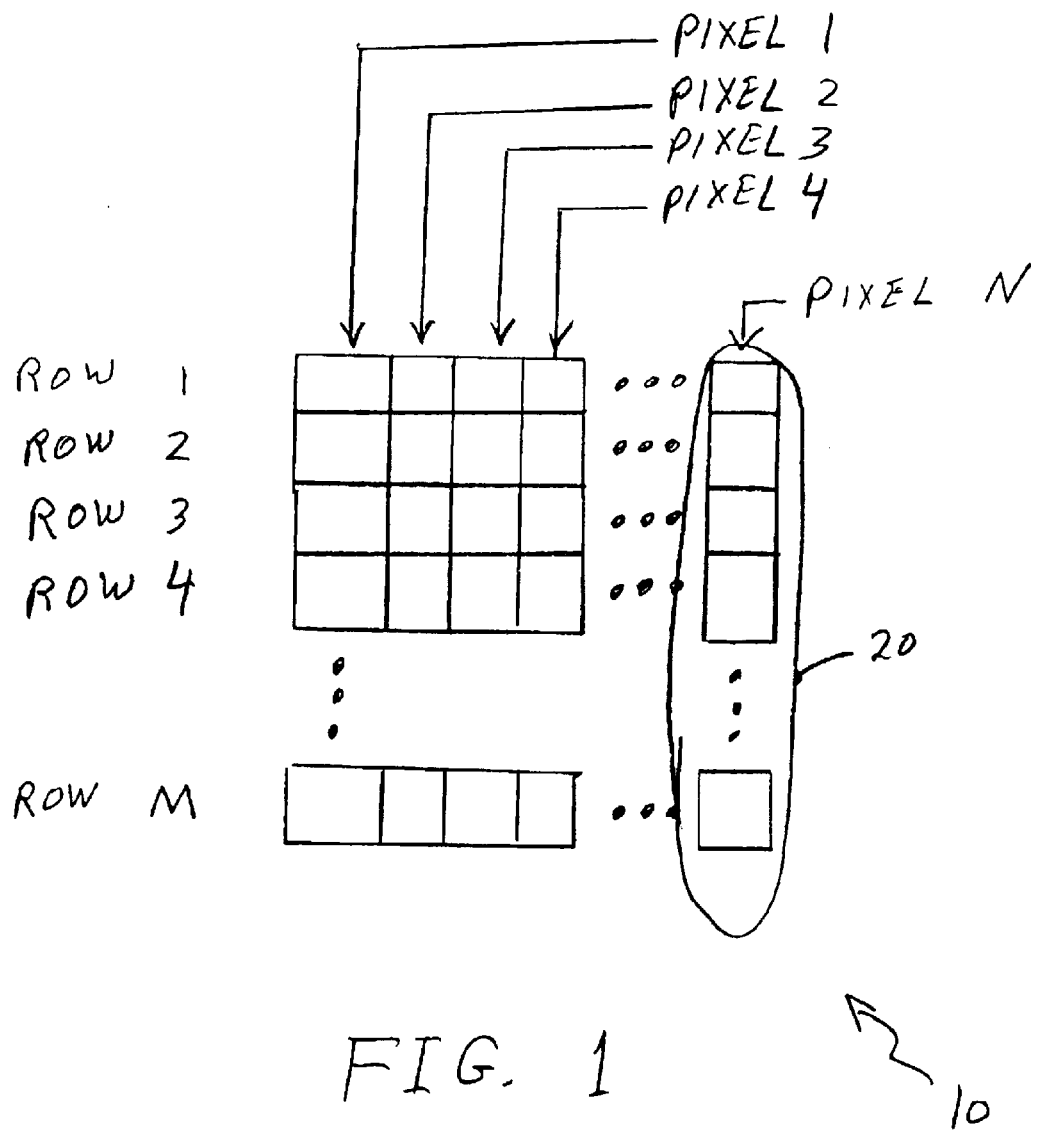
FIG. 1 is a functional schematic diagram of a sensor array according to the present invention.

In order to attain the same TDI functionality with a CMOS image sensor, the image region of the sensor is configured as in FIG. 1 with M rows and N columns. As the image progresses across the image region, the pixels are individually read and their voltages added to a storage region located adjacent to the image region. The architecture is illustrated schematically for a single column slice in FIG. 2.

Figure 5:
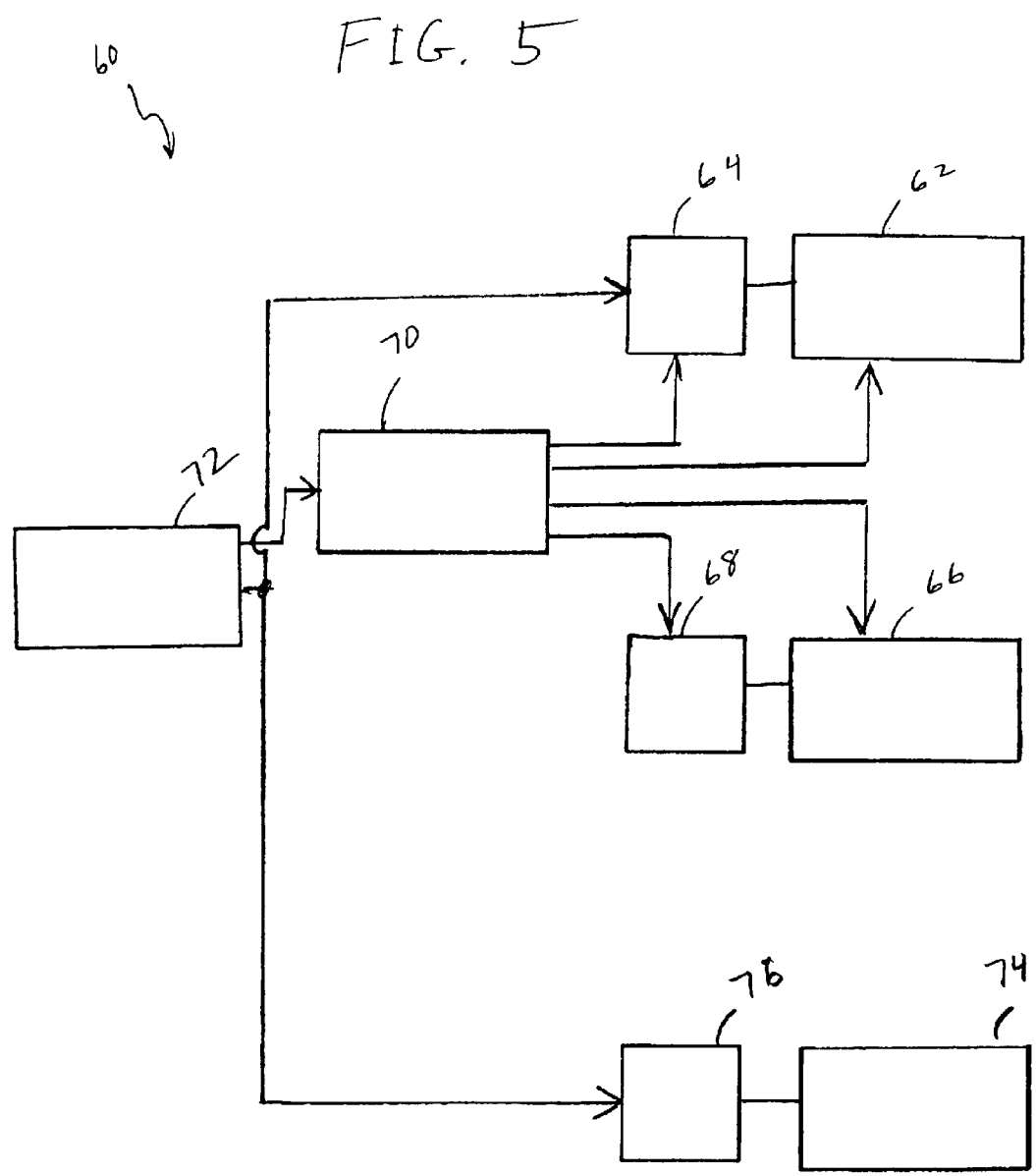
FIG. 5 is a functional schematic diagram of a control circuit as used in the present invention.

The operation begins by loading a single "1" into the first position in shift registers 62, 66 and 74 FIG. 5). A "1" in a particular element of shift register 62 causes the row that corresponds to that position in the shift register to be enabled (i.e., for the outputs of each of the pixels in that row to be connected to the column output buses). A "1" in a particular element of shift register 66 causes the signal on the output bus of each column to be routed to an accumulator in the same column and at the row adjacent to the position of the '1' in the shift register. The signal that is routed to the accumulator is added to the signal that is already stored there. A '1' in a particular element shift register 74 causes the total stored signal in the accumulator for each column in the row adjacent to that shift register element to be routed to multiplexer output circuitry of the sensor. Assume that the shift registers are each configured such that when the "1" reaches the end of the shift register, then on the next shift, the entry in the last register becomes '0' and the entry at the beginning of the register becomes "1", (i.e., a cycling shift register).

Assume that the image is translated across the image region a rate equal to the row separation physical extent divided by Tline, (i.e., the image is translated by the row pitch in a tline, Tline). During the first period, 0<t<Tline, the "1" that starts at the beginning of shift registers 62 and 66 is shifted through the registers one register element at a time until the end of a complete cycle. For each individual column, the pixel data from rows 1 through M is stored in the corresponding column accumulator sites in rows 1 through M, respectively. After the last read operation of the cycle, the entry in the beginning element of 62 and 66 will be returned to a '1' since the shift registers are cyclic.

The output from the appropriate accumulator is then routed to the column output. Then, shift registers 62 and 74 are triggered one additional time such that the "1" in each of registers 62 and 74 (but not register 66) moves into the second position. The timing described above is repeated in the same manner continuously. After the first M cycles (i.e., for t>M Tline), the outputs from the accumulators will correspond to TDI output with a signal size that is M times as large as the signal for a single line time.

Figure 2:
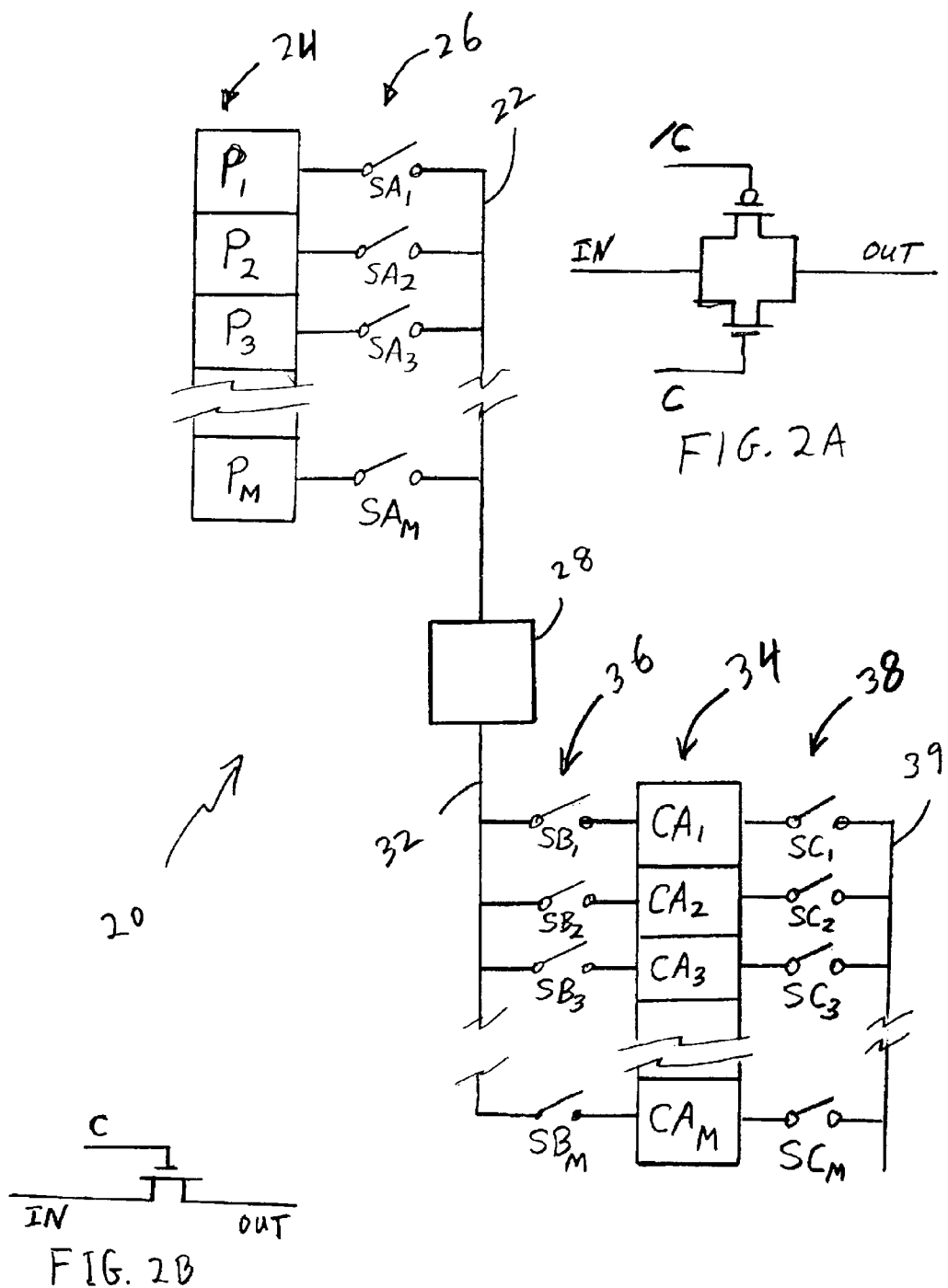
FIG. 2 is a functional schematic diagram of a column slice of the sensor array according to the present invention.

The architecture is divided into an image region and a storage region. The image region is N columns wide by M rows. In FIG. 1, sensor array 10 includes rows 1 through M, each row having pixels 1 through N therein. Column slice 20 contains pixel N from all rows 1 through M. For each pixel in the image region, there is an accumulation cell in the in the storage region. In FIG. 2, the circuitry within the storage region is only illustrated for a single column.

In FIG. 2, a sensor includes column slice 20, and column slice 20 includes column bus 22, column of pixels 24, first plurality of switches 26, column of accumulators 34, and second plurality of switches 36. Column slice 20 also includes third plurality of switches 38 and output bus 39. Column of pixels 24 includes pixels $p_1$, $P_2$, $P_3$ through $P_M$, and column of accumulators 34 includes current accumulators $CA_1$, $CA_2$, $CA_3$ through $CA_M$. First plurality of switches 26 includes switches $SA_1$, $SA_2$, $SA_3$ through $SA_M$, second plurality of switches 36 includes switches $SB_1$, $SB_2$, $SB_3$ through $SB_M$ and third plurality of switches 38 includes switches $SC_1$, $SC_2$, $SC_3$ through Each switch of first plurality of switches 26 is coupled between column bus 22 and a corresponding pixel of column of pixels 24, and each switch of second plurality of switches 36 is coupled between column bus 22 and a corresponding accumulator of column of accumulators 34.

Any known or future pixel type may be used in column of pixels 24. Preferably, the pixel type produces a voltage level at an output. Preferably, the switches of first plurality of switches 26 are transmission type switches that transmit a voltage level from a pixel output onto column bus 22. In FIG. 2A, a complimentary MOS (CMOS) switch type is shown as an example. In FIG. 2B, a single NMOS transistor switch type is shown and is preferred in many designs to achieve a greater fill factor, for example, for use as switches 26. In operation, only one switch at a time of first plurality of switches 26 is "on" to connect the voltage signal from a corresponding pixel to the column bus while all remaining switches of first plurality of switches 26 are "off" to isolate the column bus from all remaining pixels.

In FIG. 2, transimpedance amplifier 28 converts the voltage level on column bus 28 into a current supplied to bus 32. In operation, only one switch at a time of second plurality of switches 36 is "on" to connect the signal on bus 32 to an accumulator while all remaining switches of second plurality of switches 36 are "off" to isolate bus 32 from all remaining accumulators so that all current provided by transimpedance amplifier 28 is provided to the selected current accumulator.

Figure 3:
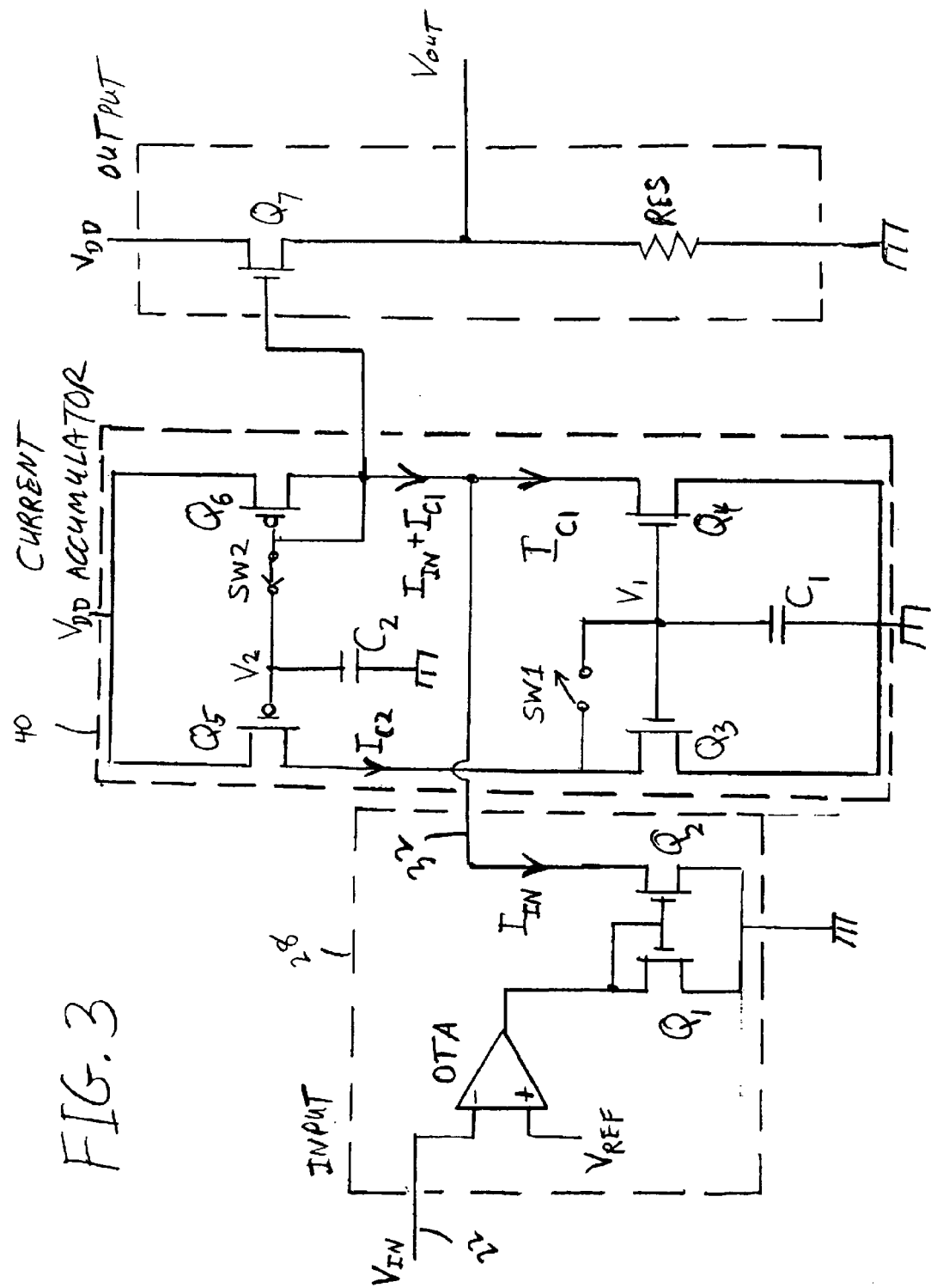
FIG. 3 is a circuit schematic diagram of a current accumulator according to the present invention.

In FIG. 3, transimpedance amplifier 28 receives input voltage $V_{IN}$ from column bus 22. It includes operational transimpedance amplifier OTA to translate the voltage level at $V_{IN}$ relative to voltage reference $V_{REF}$ into a current. The current is provided to a current mirror circuit that includes matched transistors $Q_1$ and $Q_2$ where mirrored current $I_{IN}$ is defined by $V_{IN}$. Mirrored current $I_{IN}$ sinks into transistor $Q_2$ and draws current from bus 32 (FIG. 2).

In FIG. 3, the switches of second plurality of switches 36 are not shown. Instead FIG. 3 shows current accumulator 40 connected directly to bus 32 through the unseen but "on" switch of second plurality of switches 36.

Current accumulator 40 operates in two modes depending on the positions of "on" switches SW1 and SW2. Switches SW1 and SW2 are preferably like any of the other switches in column of switches 26, 36 or 38.

The first mode is defined as being while switch SW1 is "off" and switch SW2 is "on" as is depicted in FIG. 3. Accumulator 40 is operated in the first mode while the current accumulator is connected to bus 32. In this first mode, since switch SW1 is "off", transistor $Q_4$ functions as a transimpedance amplifier to translate voltage $V_1$ stored on capacitor $C_1$ into current $I_{c1}$. Current $I_{C1}$ combines with current $I_{IN}$ from bus 32 to affect voltage $V_2$ on capacitor $C_2$ with the help transistor $Q_6$ since SW2 is "on". The voltage on capacitor $C_2$ will ordinarily tend toward a ground voltage except that transistor $Q_6$, connected to drain supply voltage $V_{DD}$, limits the decline in $V_2$ so that $V_2$ stabilizes at a voltage defined by a current that is the sum of current $I_{C1}$ and current $I_{IN}$.

The second mode is defined as being while switch SW1 is "on" and switch SW2 is "off" opposite of what is depicted in FIG. 3. Accumulator 40 is operated in the second mode while the current accumulator is isolated from bus 32. In this second mode, since switch SW2 is "off", transistor $Q_5$ functions as a transimpedance amplifier to translate voltage $V_2$ stored on capacitor $C_2$ into current $I_{C2}$. Current $I_{C2}$ affects voltage $V_1$ on capacitor $C_1$ with the help transistor $Q_3$ since switch SW1 is "on" in this second mode. The voltage on capacitor $C_1$ will ordinarily tend toward voltage $V_{DD}$ except that transistor $Q_3$, connected to ground, limits the rise in $V_1$ so that $V_1$ stabilizes at a voltage defined by current $I_{C2}$. Thus, in this second mode, the new voltage on capacitor $C_1$ is defined by the accumulated current that is the sum of current $I_{C1}$ and current $I_{IN}$. Each time current accumulator 40 is cycled through its first and second modes (i.e., current accumulator 40 is selected and then deselected), the current $I_{IN}$ on bus 32 (that is defined by the voltage on column bus 22) will be accumulated.

Other circuits that perform this accumulation function will be apparent to persons skilled in the art in light of these teachings. Moreover, it will be apparent to persons skilled in the art in light of these teachings that transimpedance amplifier 28 may be coupled between second plurality of switches 36 and column of accumulators 34 instead of being coupled between column bus 22 and bus 32; however, a single transimpedance amplifier 28 would be required for each accumulator of column of accumulators 34. Similarly, it will be apparent to persons skilled in the art in light of these teachings that transimpedance amplifier 28 may be coupled between column of pixels 24 and first plurality of switches 26 instead of being coupled between column bus 22 and bus 32; however here too, a single transimpedance amplifier 28 would be required for each pixel of column of pixels 24. Should a pixel technology be used that produces a current instead of a voltage, then transimpedance amplifier 28 is not used since the pixel current is routed to the corresponding current accumulator. Alternatively, should an accumulator technology be used that accumulates voltage instead of current, then transimpedance amplifier 28 is not used since the pixel's voltage is routed to the voltage accumulator. As use herein, column bus 22 (carrying a voltage level) and bus 32 (carrying a current) will both be regarded as the column bus since both carry the signal from the pixel to the accumulator, albeit one carries the signal in voltage form and the other carries the signal in current form.

In FIG. 3, the output circuit includes transistor $Q_7$ and resistor RES. Transistor $Q_7$ is connected in a source follower configuration to output voltage level $V_{OUT}$ defined by voltage $V_2$ during the first mode of current memory 40 (i.e., while the current accumulator is connected to bus 32 and switch SW2 is "on"). Thus, when output is desired from the accumulators, a selected switch from third plurality of switches 38 is turned "on" while switch SW2 of the desired accumulator 40 is "on". Voltage level $V_{OUT}$ is defined by voltage $V_1$ when accumulator 40 is in the second mode. Persons of ordinary skill in the art will appreciate other output circuit designs may be used that are equivalent. For example, the gate electrode of transistor $Q_7$ may be re-connected directly to the $V_2$ side of capacitor $C_2$ so that the state of switch SW2 would not matter.

In FIG. 3, the switches of third plurality of switches 38 are not shown. Instead FIG. 3 shows current accumulator 40 connected directly to the output circuit through the unseen but "on" switch of third plurality of switches 38. Individual output circuits (e.g., source followers) may be provided for each accumulator, in such case the third plurality of switches are coupled to the output side of each output circuit.

Sensor 10 (FIG. 1) includes a main control circuit (FIG. 5). In FIG. 5, main control circuit includes first switch control circuit 62 and second switch control circuit 66 to control first and second plurality of switches 26, 36 to couple a signal from a pixel of column of pixels 24 to an accumulator of column of accumulators 34 while updating the accumulator.

Figure 4:
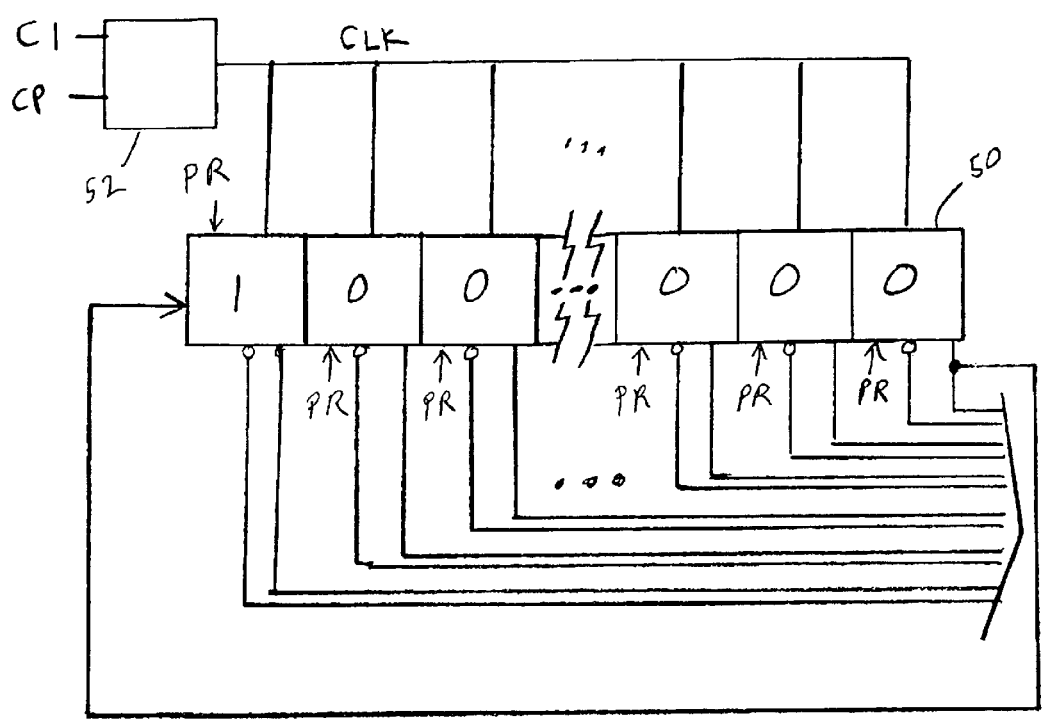
FIG. 4 is a functional schematic diagram of a representative switch control and increment control circuits as used in the present invention.

In FIG. 4, a typical switch control circuit 50 constitutes any of either first, second or third switch control circuit 62, 66 or 74 that are part of the main control circuit (FIG. 5). Switch control circuit 50 includes a plurality of single bit registers, each register corresponding to a switch to be controlled, for example, in first, second or third plurality of switches 26, 36 or 38, respectively. The main control circuit (FIG. 5) of sensor 10 includes first, second and third switch control circuits 62, 66, 74. In a preferred embodiment the switch control circuit is a shift register that is preset (using preset signal PR) with a fixed bit pattern of a single "1", and the rest "0" (zeros), for example, "100 . . . 000". Each bit position is connected to a corresponding switch to be controlled either directly or through drivers that may or may not include a gate with an enabling input control. For example, first switch control circuit 62 is connected to control a selected switch of first plurality of switches 26 to connect a signal from a selected pixel of column of pixels 24 to column bus 22 while controlling all remaining switches of first plurality of switches 26 to isolate column bus 22 from all remaining pixels of column of pixels 24 (see FIG. 2). Preferably each register element of switch control circuit 50 outputs both true and comp signals of the stored bit for easy control of a corresponding CMOS transmission switches (FIG. 2A).

Similarly, second switch control circuit 66 is connected to control a selected switch of second plurality of switches 36 to connect the signal on bus 32 to a selected accumulator of column of accumulators 34 while controlling all remaining switches of second plurality of switches 36 to isolate bus 32 from all remaining accumulators of column of accumulators 34. In a preferred embodiment, switch SW1 of current accumulator 40 is controlled to be "off" and switch SW2 of current accumulator 40 is controlled to be "on" when the corresponding switch in second plurality of switches 36 is controlled to be "on". Persons skilled in the art will appreciate in light of these teachings that other switch control circuits, such as decoder or addressing trees, may be used, and it will be apparent to persons of ordinary skill in the art in light of these teachings that other types of switches may be used.

In FIG. 4, increment control circuit 52 is part of the main control circuit as either first increment control circuit 64, second increment control circuit 68 or third increment control circuit 76. In one embodiment, increment control circuit 52 issues clock signal CLK synchronous with clock pulse CP when gate control signal C1 is present. This causes the information content of shift register 50 to shift in a circular manner. In FIG. 5, first increment control circuit 64 increments first switch control circuit 62 by shifting to control a next in succession switch of first plurality of switches 26 to connect a signal from a next in succession pixel of column of pixels 24 to column bus 22 while controlling all remaining switches of first plurality of switches 26 to isolate column bus 22 from all remaining pixels of column of pixels 24. In FIG. 5, second increment control circuit 68 increments second switch control circuit 66 by shifting to control a next in succession switch of second plurality of switches 36 to connect the signal on bus 32 to a next in succession accumulator of column of accumulators 34 while controlling all remaining switches of second plurality of switches 36 to isolate bus 32 from all remaining accumulators of column of accumulators 34. In FIG. 5, third increment control circuit 76 increments third switch control circuit 74 by shifting to control a next in succession switch of third plurality of switches 38 to connect the signal accumulated in next in succession accumulator of column of accumulators 34 to output bus 39 while controlling all remaining switches of third plurality of switches 38 to isolate output bus 39 from all remaining accumulators of column of accumulators 34. Each increment control circuit may be as simple as a logic gate.

Alternatively, a clock generator (not shown) may be used to provide a burst of M clock pulses (CLK) when triggered to cause first and second switch control circuits 62 and 66 to shift once per clock pulse. Then, it is unnecessary to provide second increment control circuit 68, but it is still necessary to provide first increment control circuit 64 with a way to provide an additional clock pulse. Third increment control circuit 76 may be unnecessary as a separate circuit since it is triggered by second repeat control circuit 72 only once for each triggering of the first repeat control circuit 70.

In FIG. 5, the main control circuit further includes first repeat control circuit 70 to repetitively operate first increment control circuit 64, first switch control circuit 62, second increment control circuit 68 and second switch control circuit 66. During each repetitive operation of first switch control circuit 62, signals from successive pixels of column of pixels 24 are coupled onto column bus 22. During each repetitive operation of second switch control circuit 66, signals that were coupled onto column bus 22 from a pixel and from there onto bus 32 are coupled into corresponding accumulators of column of accumulators 34. Each time first repeat control circuit 70 is operated, first repeat control circuit 70 repetitively addresses first and second plurality of switches 26 and 36 and then operates first and second increment control circuits 64 and 68 until all pixels of column of pixels 24 have been successively coupled onto column bus 22 and the signal on bus 32 has been successively coupled into and accumulated in all accumulators of column of accumulators 34. This successively transfers signals from pixel to accumulator for any kind of array sensor. Preferably, first repeat control circuit includes a counter to control the operation of first and second increment control circuits 64 and 68 to increment as many times as there are pixels and accumulators in column of pixels 24 and column of accumulators 34. The successive transfer of signals from pixel to accumulator need not be performed in any particular order; however, it is preferable that the order be in the same direction as a moving image projected on column slice 20 (FIG. 1).

In FIG. 5, the main control circuit further includes second repeat control circuit 72 to operate first and third increment control circuits 64 and 76 an additional time (without operating second increment control circuit 68) and then operate first repeat control circuit 70 each time second repeat control circuit is operated. This second repeat control circuit 72 causes a normal array sensor to operate as a time delay and integration sensor (TDI sensor). In operation, a moving image is focused on sensor array 10. Sensor array 10 is aligned and oriented so that a point in the moving image moves along column slice 20 (see FIG. 1). Alternatively, the image may be fixed and sensor array 10 moving since it is the relative motion that is important. The main control circuit operates second repeat control circuit 72 each time the point in the moving image projected on column of pixels 24 transverses a single pixel boundary. Typically, the moving image, for example, from a moving conveyer belt, progresses at a known and fixed rate. Therefore, a point in the image moves across a pixel boundary at a fixed interval. In this way it is possible to operate second repeat control circuit 72 at the same fixed interval. In fact, the main control circuit repetitively operates the second repeat control circuit until the point in the moving image traverses the entire column of pixels 24.

Each operation of second repeat control circuit 72 operates first and third increment control circuits 64 and 76 for one additional time without directly operating second increment control circuit 68. In this way, second repeat control circuit 72 operates first and third increment control circuits 64 and 76 to cause first and third switch control circuit 62 and 74 (e.g., shift registers) to be shifted one element more than second switch control circuit 66.

The additional shift of first switch control circuit 62 with respect to second switch control circuit 66 is responsible for the TDI effect of integrating the image in column slice 20 as the point in the moving image passes a pixel boundary. The additional shift redirects the outputs of the column of pixels into the accumulators that correspond to the position where the original image was stored so that like points in the moving image are integrated over time. Then, first repeat control circuit 70 operates both first and second increment control circuits 64, 68 repeatedly for one full cycle as the image information stored in column of pixels 24 is transferred to and accumulated in column of accumulators 34 one pixel at a time.

Sensor 10 further includes output bus 39 and third plurality of switches 38 (see FIG. 2). Each switch is coupled between output bus 39 and a corresponding accumulator of column of accumulators 34. The main control circuit (FIG. 5) includes third switch control circuit 74 to control third plurality of switches 38 to couple an accumulated signal from an accumulator of column of accumulators 34 to output bus 39. Third switch control circuit 74 controls a switch of third plurality of switches 38 to connect the accumulated signal from an accumulator of column of accumulators 34 to output bus 39 while controlling all remaining switches of third plurality of switches 38 to isolate output bus 39 from all remaining accumulators of column of accumulators 34.

The main control circuit further includes third increment control circuit 76 to increment third switch control circuit 74 to control a next in succession switch of third plurality of switches 38 to connect the accumulated signal at a next in succession accumulator of column of accumulators 34 to output bus 39 while controlling all remaining switches of third plurality of switches 38 to isolate output bus 39 from all remaining accumulators of column of accumulators 34.

The second repeat control circuit repetitively operates third increment control circuit 76 and third switch control circuit 74 through a full cycle. Each repetitive operation of third switch control circuit 74 couples a signal from a successive accumulator of column of accumulators.

Each time second repeat control circuit 72 is operated, the second repeat control circuit repetitively operates third increment control circuit 76 and third switch control circuit 74 until all accumulators of column of accumulators 34 have been successively coupled onto output bus 39.

The main control circuit operates second repeat control circuit 72 each time a point in a moving image projected on column of pixels 34 transverses a pixel boundary, and the main control circuit repetitively operates the second repeat control circuit until the point in the moving image traverses the column of pixels.

The entirety of the circuit is preferably implemented on a single semiconductor wafer; however, the circuit need not be implemented on a single wafer. For example, the accumulators and switch circuits may be formed in a second semiconductor wafer separate from the imager or could even be formed of discrete circuit components. An advantage of keeping the accumulators and imager on the same wafer is that all columns can be processed in parallel. If the accumulators were located separately from the imager, then separate bond wires and package pins would be required for each column, or the column data would have to be multiplexed together and read out of the imager serially through a single connection and then redistributed to the correct accumulator.

Figure 6:
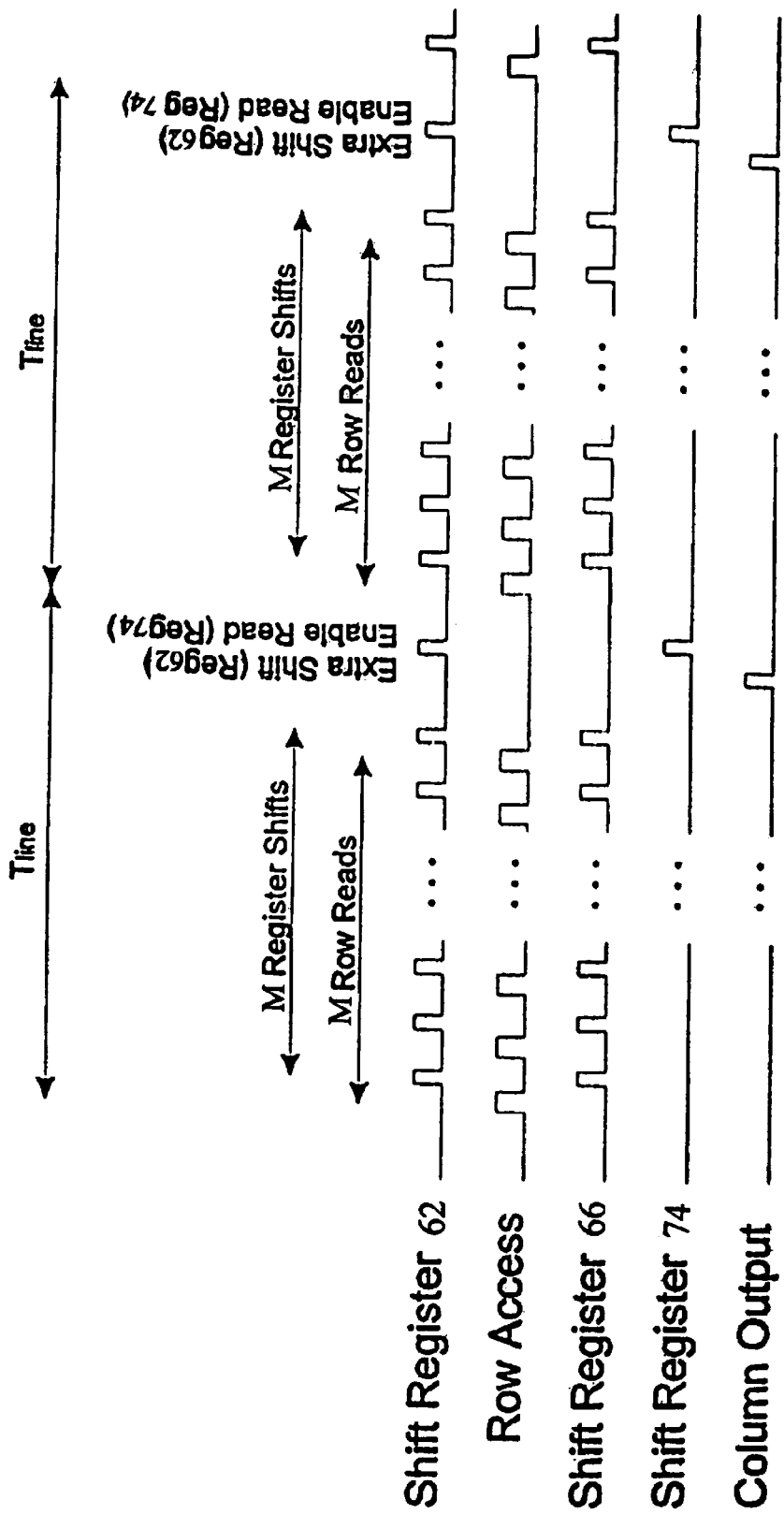
FIG. 6 is a timing diagram of an operation of the present invention.

FIG. 6 is a timing diagram showing the operation of the present invention. The operation of first repeat control circuit 70 is shown during two full cycles of "row reads" and "register shifts". The operation during each cycle is to transfer pixel signals from all pixels to corresponding accumulators. Row access is repeated M times during each cycle. During each row access, one switch from first plurality of switches 26 and a corresponding switch from second plurality of switches 36 is enabled to transfer a pixel signal to an accumulator. Immediately after the row access, shift registers 62 and 66 are clocked. After all M rows have been accessed and the immediately following shifts of shift registers 62 and 66 have been executed, the cycle is complete and first repeat control circuit 70 waits for the next initiating command.

The operation of second repeat control circuit 72 is (1) read an accumulated signal from the one accumulator that is currently addressed by third switch control circuit 74 through the corresponding switch of third plurality of switches 38 onto output bus 39 (2) provide an additional clock to shift registers 62 and 74, and (3) initiate a new pixel transfer cycle controlled by first repeat control circuit 70. Second repeat control circuit 72 is initiated synchronously with the times a point in a moving image traverses a pixel boundry, a time interval defined as Tline. Alternatively, a new pixel trans cycle controlled by first repeat control circuit 70 may be initiated before the output is read and shift registers 62 and 74 are clocked. The same pattern repeats continuously. Valid TDI data is produced at the output after a time interval of M times Tline has elapsed.

In FIG. 7, a method of scanning an image is shown in flow chart form. The method starts by entry into node N1, passes through nodes N2 and N3 and begins step S1, a step of updating a column of accumulators from a column of pixels by repeatedly incrementing first and second switch control circuits in step S15. After the last pixel in the column of pixels has been updated as determined in step S14, the first switch control circuit is incremented and a third switch control circuit is incremented in step S22 to output an accumulated value from the column of accumulators in step S23.

Step S1, the step of updating a column of accumulators, includes steps S1 and S12 for transferring a pixel signal from a pixel selected from the column of pixels based on the first switch control circuit into an accumulator selected from the column of accumulators based on the second switch control circuit. Steps S11 and S12 for transferring a pixel signal includes step S11 for addressing the selected pixel based on the first switch control circuit to transfer a selected pixel signal from the selected pixel onto a column bus, and step S12 for addressing the selected accumulator based on the second switch control circuit to transfer the selected pixel signal from the column bus into the selected accumulator.

Step S1 also includes step S13 for updating the selected accumulator to update an accumulator signal value stored in the selected accumulator based on the selected pixel signal.

Step S1, the step of updating a column of accumulators, further includes steps S14 and S15 for successively repeating the steps of transferring a pixel signal from a pixel and updating the selected accumulator to update each accumulator in the column of accumulators.

The method further includes step S21, a step to cause successive repeating of the steps of updating a column of accumulators (e.g., step S1) and incrementing the first switch control circuit and a third switch control circuit (e.g., step S22) to output an accumulated value from each accumulator in the column of accumulators (e.g., step S23).

Step S22, the step of incrementing the first switch control circuit and a third switch control circuit to output an accumulated value (e.g., step S23) includes transferring the accumulated value from an accumulator selected from the column of accumulators based on the third switch control circuit onto an output bus.

It may be noted that the noise performance may be inferior to what could be accomplished with true charge transfer. Where charge transfer is employed the signal is read only once whereas in the approach outlined above the signal corresponding to any one part of the scene must be read M times. The read noise will therefore be larger by the square root of M in the approach presented above than for an approach using true charge transfer. However the net SNR (signal to noise ratio) for read noise will still be smaller by the square root of M than the net SNR for a simple line scan sensor. Therefore, the improved SNR justifies the use of a CMOS TDI approach. Furthermore, the shot noise component of the total noise will be identical for the charge transfer and CMOS approaches, and the TDI approach provides an improvement in the shot noise contribution to the SNR over a simple line scan sensor by a factor of the square root of M.

The approach disclosed above is at a high level of hierarchy. There are other ways to implement the individual components and/or the busing arrangement. The accumulators may be implemented to store signals as charge, voltage, or current. The pixels in the image region may be implemented as photodiodes, photogates, pinned photodiodes, etc. Arrays of various sizes will require differing drive characteristics of the components, and thus, the choice of where transimpedance amplifier 28, the accumulator output circuit and/or other circuits are located within the general bus structure taught herein will vary but such modifications will be appreciated by persons skilled in this art in light of these teachings.

Having described preferred embodiments of a novel CMOS image sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

What is claimed is:

1. A sensor comprising:
   a column bus;
   a column of pixels;
   a first plurality of switches, each switch being coupled between the column bus and a corresponding pixel of the column of pixels;
   a column of accumulators;
   a second plurality of switches, each switch being coupled between the column bus and a corresponding accumulator of the column of accumulators;
   a first switch control circuit operable to control a switch of the first plurality of switches to connect the signal from the pixel of the column of pixels to the column bus while controlling all remaining switches of the first plurality of switches to isolate the column bus from all remaining pixels of the column of pixels;
   a second switch control circuit operable to control a switch of the second plurality of switches to connect the signal on the column bus to the accumulator of the column of accumulators while controlling all remaining switches of the second plurality of switches to isolate the column bus from all remaining accumulators of the column of accumulators;
   a first increment control circuit operable to increment the first switch control circuit to control a next in succession switch of the first plurality of switches to connect a signal from a next in succession pixel of the column of pixels to the column bus while controlling all remaining switches of the first plurality of switches to isolate the column bus from all remaining pixels of the column of pixels;
   a second increment control circuit operable to increment the second switch control circuit to control a next in succession switch of the second plurality of switches to connect the signal on the column bus to a next in succession accumulator of the column of accumulators while controlling all remaining switches of the second plurality of switches to isolate the column bus from all remaining accumulators of the column of accumulators;
   a first repeat control circuit operable to repetitively operate the first increment control circuit, the first switch control circuit, the second increment control circuit, and the second switch control circuit; and
   a second repeat control circuit operable to operate the first increment control circuit and then operate the first repeat control circuit each time the second repeat control circuit is operated.

2. The sensor of claim 1, wherein the second repeat control circuit operates each time a point in a moving image projected on the column of pixels transverses a pixel boundary.

3. The sensor of claim 2, wherein the second repeat control circuit repetitively operates until the point in the moving image traverses the column of pixels.

4. The sensor of claim 1 further comprising:
   an output bus; and
   a third plurality of switches, each switch being coupled between the output bus and a corresponding accumulator of the column of accumulators.

5. The sensor of claim 4 further comprising a third switch control circuit operable to control a switch of the third plurality of switches to connect the accumulated signal from the accumulator of the column of accumulators to the output bus while controlling all remaining switches of the third plurality of switches to isolate the output bus from all remaining accumulators of the column of accumulators.

6. The sensor of claim 5 further comprising a third increment control circuit operable to increment the third switch control circuit to control a next in succession switch of the third plurality of switches to connect the accumulated signal at a next in succession accumulator of the column of accumulators to the output bus while controlling all remaining switches of the third plurality of switches to isolate the output bus from all remaining accumulators of the column of accumulators.

7. The sensor of claim 6, wherein:
   the second repeat control circuit repetitively operates the third increment control circuit and the third switch control circuit; and
   each repetitive operation of the third switch control circuit couples a signal from a successive accumulator of the column of accumulators.

8. The sensor of claim 7, wherein each time the second repeat control circuit is operated, the second repeat control circuit repetitively operates the third increment control circuit and the third switch control circuit until all accumulators of the column of accumulators have been successively coupled onto the output bus.

9. The sensor of claim 8, wherein the second repeat control circuit operates each time a point in a moving image projected on the column of pixels transverses a pixel boundary.

10. The sensor of claim 9, wherein the second repeat control circuit repetitively operates until the point in the moving image traverses the column of pixels.

* * * * *

UNITED STATES PATENT AND TRADEMARK OFFICE
CERTIFICATE OF CORRECTION

PATENT NO. : 6,906,749 B1
DATED : June 14, 2005
INVENTOR(S) : Eric C. Fox

It is certified that error appears in the above-identified patent and that said Letters Patent is hereby corrected as shown below:

Column 12,
Lines 3 and 47, "transverses" should read -- traverses --.

Signed and Sealed this

Thirteenth Day of September, 2005

JON W. DUDAS
*Director of the United States Patent and Trademark Office*